United States Patent [19]

Cree

[11] Patent Number: 4,952,361
[45] Date of Patent: Aug. 28, 1990

[54] SURFACE TREATMENT OF POLYOLEFIN OBJECTS

[75] Inventor: Stephen H. Cree, Edinburgh, United Kingdom

[73] Assignee: Dyneema V.o.F., Sittard, Netherlands

[21] Appl. No.: 257,802

[22] Filed: Oct. 14, 1988

[30] Foreign Application Priority Data

Oct. 14, 1987 [NL] Netherlands .................. 8702447

[51] Int. Cl.$^5$ .................. B29C 47/00; B29C 71/00
[52] U.S. Cl. .................. 264/204; 264/205; 264/210.4; 264/211.13; 264/211.14; 264/211.17; 264/211.2; 264/344; 525/333.7; 526/348.1; 528/502
[58] Field of Search .................. 264/204, 205, 210.13, 264/211.14, 211.17, 211.2, 340, 344; 525/333.7; 526/348.1; 528/502

[56] References Cited

U.S. PATENT DOCUMENTS

| | | | |
|---|---|---|---|
| 3,201,302 | 8/1965 | Williams et al. | |
| 4,344,908 | 8/1982 | Smith et al. | 264/204 X |
| 4,403,012 | 9/1983 | Harpell et al. | 428/290 |
| 4,411,854 | 10/1983 | Maurer et al. | 264/205 |
| 4,422,993 | 12/1983 | Smith et al. | 264/210.8 |
| 4,430,383 | 2/1984 | Smith et al. | 264/210.8 X |
| 4,436,689 | 3/1984 | Smith et al. | 264/204 |
| 4,457,985 | 7/1984 | Harpell et al. | 428/224 |
| 4,525,564 | 7/1985 | Capaccio et al. | 526/348.1 |
| 4,668,717 | 5/1987 | Lemstra et al. | 523/322 |

FOREIGN PATENT DOCUMENTS

| | | |
|---|---|---|
| 62491 | 10/1982 | European Pat. Off. |
| 144997 | 6/1985 | European Pat. Off. |
| 181016 | 5/1986 | European Pat. Off. |
| 929180 | 6/1963 | United Kingdom |
| 1026683 | 4/1966 | United Kingdom |
| 2164897 | 4/1986 | United Kingdom .......... 264/204 |

*Primary Examiner*—Jeffery Thurlow
*Assistant Examiner*—Leo B. Tentoni
*Attorney, Agent, or Firm*—Cushman, Darby & Cushman

[57] ABSTRACT

The adhesion of highly oriented polyolefin objects, in particular polyethylene filaments, to e.g. polar, polymer matrices is improved by contacting the surface of the object with a solvent for 0.5-2 minutes at a temperature above the dissolution temperature of the polyolefin.

8 Claims, No Drawings

SURFACE TREATMENT OF POLYOLEFIN OBJECTS

BACKGROUND OF THE INVENTION

The invention relates to a process for the treatment of surfaces of highly oriented polyolefin objects.

DESCRIPTION OF THE PRIOR ART

It is known to prepare highly oriented polyolefin objects such as filaments, tapes or films using solutions of high-molecular polyolefin as starting material, see for instance U.S.-A-4.344.908, U.S.-A-4.411.854, U.S.-A-4.422.993, U.S.-A-4.430.383, U.S.-A-4.436.689, U.S. 4.668.717, GB-A-2164.897 and EP-A-181.016. In these patents a solution of a linear polyolefin with a weight average molecular weight of at least $4 \times 10^5$ g/mol is spun or extruded, the object obtained after spinning or extrusion is converted into a gel object by cooling and this gel object is stretched at increased temperature. It is also known to prepare such objects using a melt of a polyolefin as starting material, see for instance U.S. 4.525.564.

Polyolefins are nonpolar polymers that have been known for a long time and which can be, and are, used for a large number of purposes. A number of applications consist in combining polyolefins with other substances (or plastics), for example in multi-layer films or composites, or applying an adhesive, ink or paint layer or a coating to an object manufactured from a polyolefin. Use is often made of materials with a polar character in these applications. A problem in such applications is the nonpolarity of the polyolefins, on account of which it is very difficult to obtain good adhesion between the nonpolar polyolefin and materials that are more polar than the polyolefin, for example polar substances (or plastics), resins and metals.

Various solutions to this problem have been suggested, for example treating the polyolefin object with oxidizing liquids such as chromic acid (so-called etching) or subjecting it to a plasma discharge treatment as described in EP-A-62.491. However, these methods are complicated or expensive or the strength and stiffness of the polyolefin material are usually affected while, moreover, the adhesion is often unsatisfactory.

SUMMARY OF THE INVENTION

The aim of the invention is to find a process for treating polyolefin surfaces to obtain good adhesion to materials of a more polar nature than the polyolefin without the aforementioned disadvantages.

The invention relates to a process for the treatment of the surface of highly oriented polyolefin objects, which objects are obtained by converting a solution of a linear polyolefin with a weight average molecular weight of at least 400,000 g/mol into a shaped object, at a temperature above the dissolution temperature, cooling this to form a solid, gel-like object and stretching this object at increased temperature, whether or not after complete or partial removal of the solvent, characterized in that the surface of the object obtained after stretching is contacted for 0.5-2 minutes with a solvent at a temperature above the dissolution temperature of the polyolefin.

DETAILED DESCRIPTION OF THE INVENTION

Aliphatic, aromatic or chlorinated hydrocarbons, or higher aliphatic esters or ketones may, for instance, be used as solvents. Preferably a relatively volatile solvent such as decalin or xylene is used.

Mixtures of solvents may, of course, also be used.

The solvent treatment is effected at a temperature above the dissolution temperature of the polyolefin. Of course, this depends on the type of polyolefin and the type of solvent used. When high-molecular polyethylene and xylene or decalin are used as solvent this is about 100° C. In general, a temperature of about 5-25° C. above the dissolution temperature will be chosen.

The polyolefin object must be contacted with the solvent for between 0.5 and 2.0 minutes. If shorter contact times are applied, the effect of the treatment appears to be insufficient, while longer contact times result in poorer tensile strength and modulus. Preferably a contact time of 1-1.5 minutes is used.

The polyolefin object and the solvent can be contacted by, for instance, immersing the polyolefin object in or drawing it through the solvent.

Subsequently the solvent is preferably completely or largely removed from the treated object. If a relatively volatile solvent is used, this is preferably realized by evaporation.

It has been found that the adhesive power of polyolefin objects treated in this manner with respect to, for instance, polar matrices can be substantially improved by subjecting the objects to an after-treatment to improve the adhesion, for instance electron irradiation, peroxide treatment, oxidation, bromination, grafting with unsaturated monomers, or plasma or corona treatment.

Polyolefin objects treated according to the invention, such as filaments, tapes, films, can easily be glued, painted, lacquered, coated with ink or with a layer of material that is more polar than the polyolefin, etc. These treatments are known per se. The treated objects appeared to retain their adhesive strength for a long time. Even after storage for more than three months the adhesive strength of the objects treated according to the invention appeared to be hardly less than immediately after treatment.

Polyolefin objects treated according to the invention adhere well to materials with a polar character, such as resins and polyamides. This is of particular importance for example in composites: materials (the so-called matrix) reinforced with other, often fibrous, materials.

When polyolefin filaments are treated according to the invention they become extremely suitable for use as reinforcing material in composites, because the adhesion between the filament and the matrix improves considerably.

These filaments may be incorporated into polymer matrices in a manner known per se, for example by impregnation of fabrics or by winding. (A general survey of techniques commonly applied to this end is given in the 'Handbook of Composites' by Luben, G., published in 1982 by Van Nostrand Reinhold Co. (N.Y.)).

Polyolefin filaments treated according to the invention are particularly suitable for reinforcing polar polymeric materials such as epoxy, phenolic, vinyl ester, polyester, acrylate, cyanoacrylate and polymethyl methacrylate resins and polyamide materials. Preferably an epoxy resin, nylon or an unsaturated polyester is used as matrix.

The composites thus obtained have a wide range of technical applications, for example in boats, surf boards, (glider) aircraft parts, printed circuit boards and car parts, such as bonnets, mudguards, etc.

In particular, highly oriented polyolefin (polyethylene) filaments which have been obtained by ultradrawing gel filaments spun from a solution (draw ratio more than 20) and which have an extremely high tensile strength, for example more than 2 GPa in the case of polyethylene, and an extremely high modulus, for example more than 50 GPa, are used as polyolefin objects.

As high-molecular linear polyolefin polyethylene with a weight average molecular weight of at least $4 \times 10^5$ g/mol, especially of at least $6 \times 10^5$ g/mol, is preferably used, which may contain minor amounts, preferably at most 5 mole %, of one or more other alkenes copolymerised with it, such as propylene, butene, pentene, hexene, 4-methylpentene, octene, etc., with the polymer chains consisting of unbranched carbon chains of at least 100 carbon atoms, preferably at least 300 carbon atoms, between carbon atoms with side chains of more than 1 C atom. Preferably a polyethylene containing 2–30, in particular 3–12 methyl or ethyl side groups per 1000 carbon atoms is used. The polyethylene may contain minor amounts, preferably at most 25 wt% based on the total polymer, of one or more other polymers, in particular an alkene-1-polymer such as polypropylene, polybutene or a copolymer of propylene with a minor amount of ethylene. In addition, a poly-propylene or ethylene-propylene copolymer may be used as high-molecular linear polyolefin.

The invention will now be elucidated with some examples, without, however, being limited thereto.

EXAMPLE I

A polyethylene fibre (Mw=$1.9 \times 10^6$ g/mol) with a modulus of 109 GPa, a tensile strength of 2.4 GPa, and 800 dtex, obtained according to the process described in U.S. Pat No. 4.668.717, was passed through a hot (110° C.) xylene bath at such a rate that the contact time of the fibre and the xylene was about 1 minute. The fibre was then dried in a flow of hot (70° C.) air. The tensile strength and modulus of the treated fibre were more than 90% of those of the untreated fibre.

An amount of the treated fibres was incorporated into an epoxy resin (100 parts of Europox 730 supplied by Schering, 83 parts of phthalic anhydride and 0.3 parts of benzyldimethylamine) in a ratio of 50 vol % fibre and 50 vol % resin. This mixture was shaped into a 150 mm long, 3 mm high and 4 mm wide test rod. The composite was cured at 80° C. for 5 hours and at 120° C. for 15 hours. The test rod was then sawn into 18 mm long test pieces.

The ILLS (interlaminar shear strength) of these test pieces was measured at a testing speed of 1 mm/min according to ASTM 3 point bending test D 2344. For the purpose of comparison, the ILLS was also measured of test pieces prepared according to the aforementioned process and composed of the above-mentioned epoxy resin and untreated fibre.

The results are presented below.

| Fibre | ILLS (MPa) |
|---|---|
| Untreated | 12.5 ± 0.7 |
| Swollen fibre | 18.0 ± 1.0 |

EXAMPLE II

The process of example I was repeated, with the understanding that the swollen fibre was subjected to electron irradiation of 1 MRAD in air, was subsequently immersed in a solution of divinylbenzene in xylene at 90° C. for 1 hour and then washed and dried.

The composite material was prepared as in example I.

| Results of ASTM test D 2344 | |
|---|---|
| Fibre | ILLS (MPa) |
| Untreated | 12.5 ± 0.7 |
| Grafting with divinylbenzene | 21.5 ± 0.9 |
| Swelling + grafting with divinylbenzene | 24.6 ± 0.5 |

What is claimed:

1. Process for the treatment of surfaces of highly oriented polyolefin objects, which objects are obtained by converting a solution of a linear polyolefin with a weight average molecular weight of at least 400,000 g/mol into a shaped object, at a temperature above a dissolution temperature, cooling this to form a solid, gel-like object, and stretching this object at increased temperature, after at least partial removal of the solvent wherein the surface of the object obtained after stretching is contacted with a solvent at a temperature above the dissolution temperature of the polyolefin for a contact time of 0.5-2 minutes.

2. Process according to claim 1, wherein decalin or xylene is used a solvent.

3. Process according to claim 1, wherein the object is contacted with the solvent at a temperature of 5-25° C. above the dissolution temperature of the polyolefin.

4. Process according to claim 1, wherein a contact time of 1-1.5 minutes is applied.

5. Process according to claim 1, wherein the solvent is at least partially removed from the treated polyolefin object.

6. Process according to claim 1, wherein the treated polyolefin object is subjected to an after-treatment to improve adhesion.

7. Process according to claim 1, wherein a polyolefin filament, tape or film is used as a polyolefin object.

8. Process according to claim 1, wherein a polyethylene filament which has been obtained by ultra-drawing gel filaments spun from a solution and which has a tensile strength of more than 2 GPa and a modulus of more than 50 GPa is used as a polyolefin object.

* * * * *